United States Patent [19]
Boling

[11] Patent Number: 5,964,950
[45] Date of Patent: Oct. 12, 1999

[54] METHOD AND APPARATUS FOR COOKING STARCH

[76] Inventor: David W. Boling, 50 Viewmont Cove, Jackson, Tenn. 38305

[21] Appl. No.: 08/988,367

[22] Filed: Dec. 10, 1997

[51] Int. Cl.$^6$ ............................ C08B 30/00; D06B 23/20; D06F 91/00
[52] U.S. Cl. .................................. 127/28; 127/71; 8/159; 68/13 R; 261/161
[58] Field of Search ........................... 127/28, 71; 8/159; 68/13 R; 261/161

[56] References Cited

U.S. PATENT DOCUMENTS

| | | | |
|---|---|---|---|
| 1,157,738 | 10/1915 | Tyler . | |
| 1,190,690 | 7/1916 | Tyler . | |
| 1,411,934 | 4/1922 | Rankin | 127/28 |
| 1,418,320 | 6/1922 | Miller | 127/28 |
| 2,253,262 | 8/1941 | Brierly | 127/28 |
| 2,313,574 | 3/1943 | Payne | 127/28 |
| 2,452,142 | 10/1948 | Pecker | 127/28 |
| 2,730,468 | 1/1956 | Martin | 127/28 |
| 2,940,876 | 6/1960 | Elsas | 127/28 |
| 3,105,778 | 10/1963 | Anderson | 127/28 |
| 5,437,169 | 8/1995 | Mitchell et al. | 68/17 |
| 5,680,663 | 10/1997 | Mitchell et al. | 8/159 |

*Primary Examiner*—David Brunsman

[57] ABSTRACT

A method and apparatus for cooking a starch solution and then dispensing that cooked starch solution to a commercial laundry washer provides a vessel with an interior surrounded by a wall for holding a volume of liquid, a water supply inlet for supplying water to the vessel interior, an opening for adding dry starch to the vessel interior, and a steam supply inlet for adding steam to the vessel interior so that the volume of liquid within the vessel can be heated. A level controller controls the level of fluid within the vessel in between the minimum and maximum levels. A recirculation flow line has an inlet and outlet that each communicate with the vessel interior. A gear pump mounted in the recirculation flow line pumps fluid from the inlet to the outlet in a recirculating fashion, the pump having a geared portion that breaks up starch lumps flowing in the recirculation flow line. A discharge flow line transmits the heated starch solution from the vessel interior to the commercial laundry washer and likewise provides a gear pump for breaking up starch lumps that flow through the discharge flow line.

25 Claims, 2 Drawing Sheets

METHOD AND APPARATUS FOR COOKING STARCH

BACKGROUND OF THE INVENTION

1. Field of the Invention

The present invention relates to an improved method and apparatus for cooking starch that is to be used in a commercial laundry application. Even more particularly, the present invention relates to an improved commercial starch cooking method and apparatus wherein a recirculating flow line reticulates the cooking starch solution through a gear pumping arrangement that breaks up lumps in the starch and establishes a circulation of fluid in the vessel to continually mix the starch and clean the vessel wall.

2. General Background of the Invention

During the cooking of starch two phenomena take place. Naturally occurring starch granules undergo considerable physical change, usually "swelling," until they are complete disintegrated, and the starch molecules are hydrolyzed into smaller particles. The resulting modified starch material depends upon processing conditions that are very important in determining the physical characteristics of the final starch solution. The swelling or hydrolyzed modification of starch, if precisely controlled, allows starch to be useful as a size or adhesive.

A compact cooker, reliably and consistently operable by a relatively unsophisticated individual, would be desirable. It is customary in "cooking starch" for laundry purposes to utilize temperatures in the 165 degree Fahrenheit thru 190 degree Fahrenheit range. At higher temperatures, i.e., above 250 Fahrenheit, the chemical and physical make up of the starch will continue to change in that the starch slurries will be unstable. Unstable starch slurries are of little value as size or adhesive.

Several patents have issued for starch cooking devices. Some of the suggested patented systems require the use of a tank float device (e.g., Mitchell 5,437,169) to open and close the water supply valve, via a solenoid. The float is immersed or partially immersed in the aqueous slurry of starch. Immersed operating components in starch solutions are a source of operating trouble. If the float becomes coated with starch, it fails to function, and presents overflow risks.

Some existing starch cookers (e.g., Mitchell 5,437,169; F. H. Martin 2,730,468; and E. W. Miller 1,418,320) use direct steam injection both to cook the starch and to agitate the starch solution. Existing cookers that use steam both to agitate and to cook often create starch solutions having lumps. It is believed that the concentrated heat of the steam directly on the starch solution causes localized heating and a temperature above that which the starch will remain stable. These starch lumps cause uneven starching of the garments and a build up of starch on the press covers when the garments are pressed. Furthermore, direct steam induction results in sediment within the boiler and or steam line to be mixed with the starch solution resulting in contamination and discoloration of the garments.

Some existing starch cookers (e.g., Mitchell 5,437,169; N. E. Elsas 2,940,876; and G. J. Kyame 2,516,884) use a plurality of valves to direct the contents of the containment tank either to the output conduit or the tank circulation. Problems have resulted from starch building up on such valves, including a failure of the valve to function.

Another problem with existing starch cookers is the use of microprocessors to control a plurality of relays and process signals from various controlled communications. Micro processors are particularly susceptible to heat and moisture, and both are abundantly present in commercial laundries. When micro processors are exposed to only minute amounts of moisture and/or heat they often cease to function. It would be desirable to provide an apparatus which did not have aforesaid heat and moisture susceptibility.

Some large laundries use large vats of hot starch solutions and manually transfer hot starch from the vat to the washer. The manual transfer presents a danger of burning the operator. Another problem with this method is the large size of the vats and consequently large quantities of starch. If the entire amount of starch is not used the same day it is prepared, the residual will frequently spoil and impart an unpleasant odor to the garments.

The present invention cooks a quantity of starch solution required by a single wash load of garments, and transfers the single wash quantity automatically as the washer enters the starch event of its cycle.

BRIEF SUMMARY OF THE INVENTION

An object of the present invention is to provide a new and improved apparatus wherein starch solution may be thoroughly cooked without the liability of forming lumps or solid masses in such a manner to produce a complete homogeneous mixture.

Another object of the present invention is to provide a starch cooking and dispensing apparatus wherein the starch product may be maintained within close limits at the proper temperature for obtaining the best results as to penetration of the garments and the quality of sizing.

Another object of the present invention is to provide a starch cooking/dispensing apparatus that allows commercial laundries to use dry, or uncooked starch which is more economical than other forms of starch and nearly eliminates any waste of starch.

Another object of the present invention is to provide a starch cooking/dispensing apparatus that automatically transfers the hot starch solution directly into a commercial washer. This eliminates the dangerous practice of manual transfer and exposure to burns.

It is yet another object of the present invention to provide a starch cooking/dispensing apparatus that is self-cleaning. The present invention provides an improved apparatus for cooking a starch solution and then dispensing that cooked solution to a commercial laundry washer.

The apparatus includes a vessel with an interior surrounded by a wall for holding a volume of liquid.

A water supply inlet supplies water to the vessel interior for use in making the starch solution.

The vessel provides an open top into which dry starch can be added for making the starch solution.

A steam supply inlet is provided for adding steam to the vessel interior via a header that separates the steam from the solution so that the volume of liquid within the vessel can be heated.

A level controller controls the level of fluid within the vessel in between minimum and maximum fluid levels.

A recirculation flow line provides an inlet and an outlet that each communicate with the vessel interior. A pump mounted in the recirculation flow line pumps fluid from the inlet to the outlet during a recirculation of the fluid within the vessel interior.

In the preferred embodiment, the pump includes a geared impeller that breaks up starch lumps flowing in the recirculation flow line.

A discharge flow line is provided for transmitting the heated slurry of starch and water from the vessel interior to the laundry washer.

In the preferred embodiment, a discharge pump dispenses the heated solution of starch and water from the discharged flow line to the laundry washer, wherein the discharge pump has a geared portion that breaks up starch lumps flowing therethrough.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
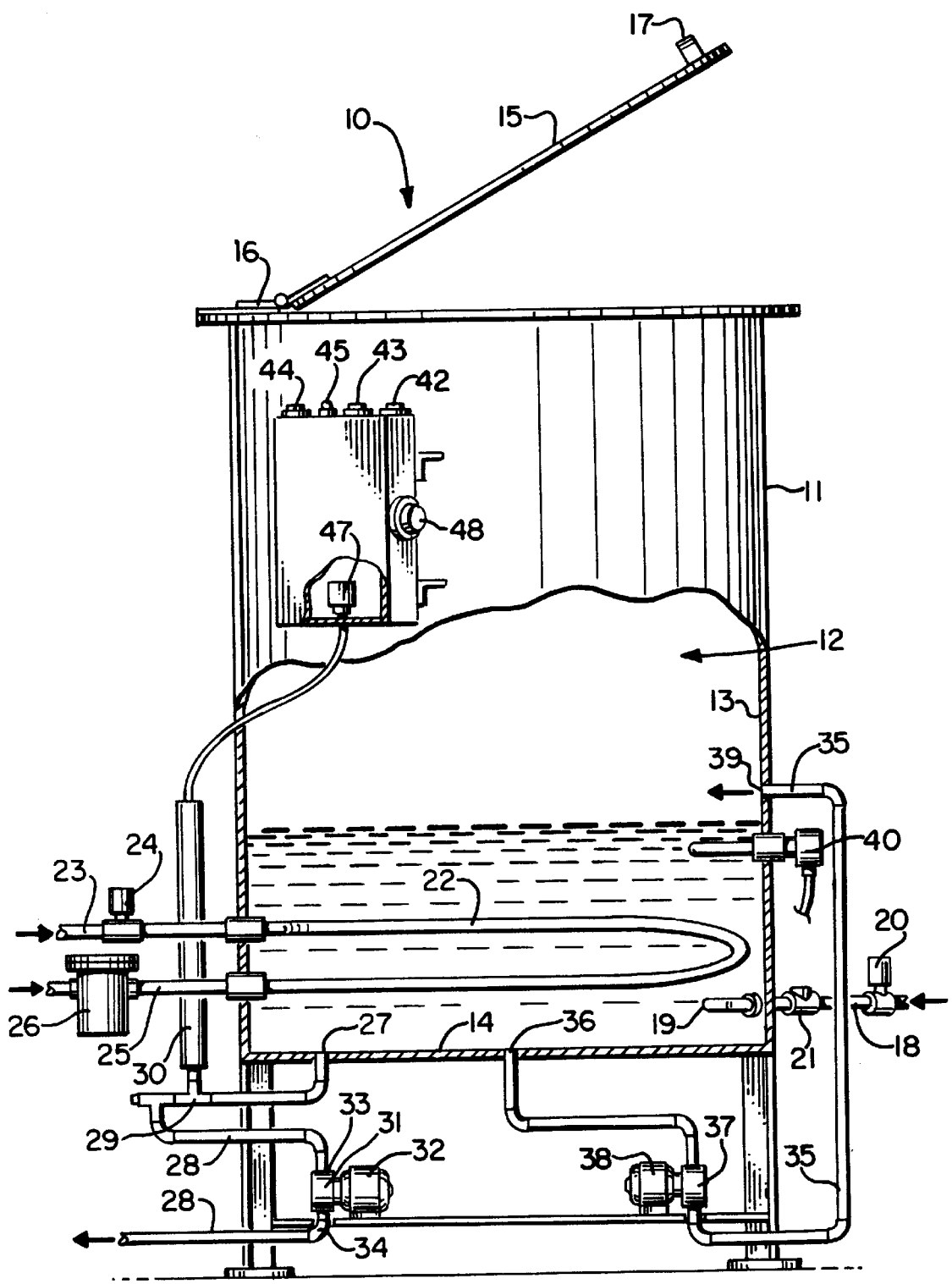
FIG. 1 is a sectional elevational view of the preferred embodiment of the apparatus of the present invention.
Figure 2:
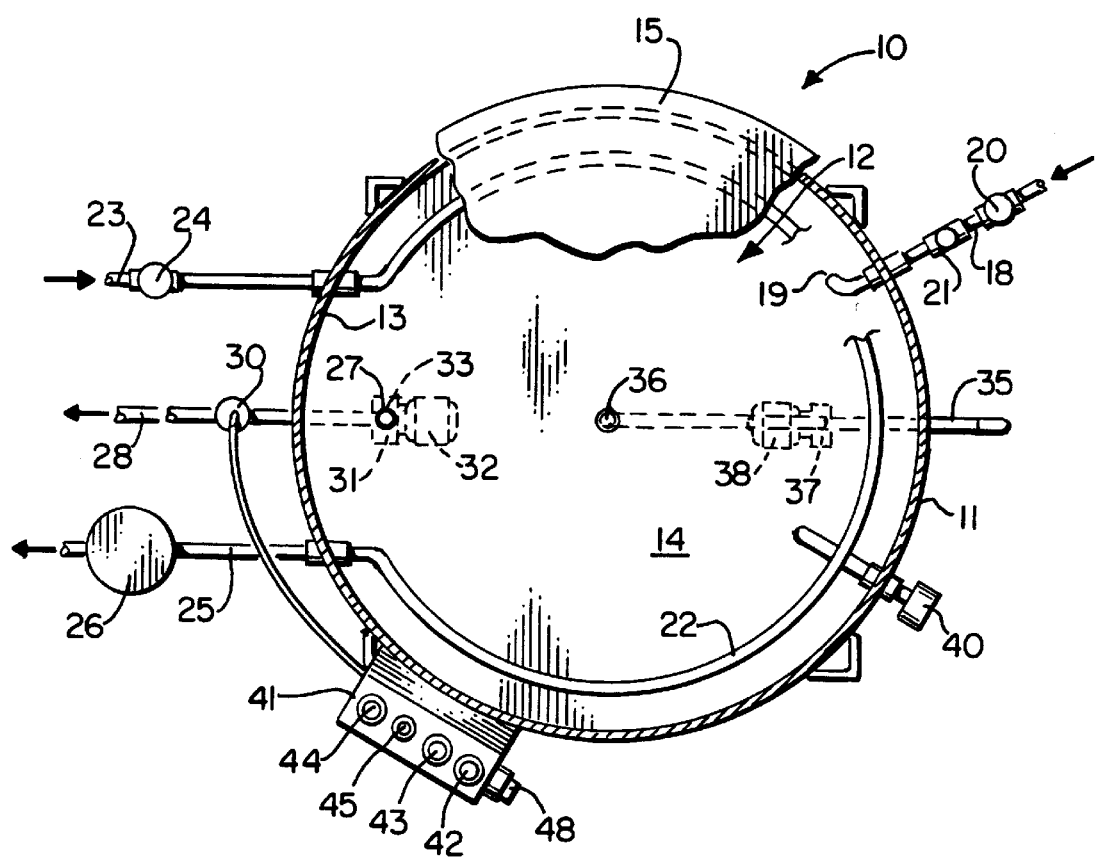
FIG. 2 is a top plan view of the preferred embodiment of the apparatus of the present invention.

FIGS. 1 and 2 show generally the preferred embodiment of the apparatus of the present invention designated generally by the numeral 10. Starch cooking apparatus 10 includes a vessel 11 having an interior 12 for containing water and dry starch that is added to the vessel through an open top, for example. The vessel 11 provides an interior 12 surrounded by side wall 13 and bottom wall 14. Vessel 11 may be fabricated of a variety of materials suitable for forming a container however, stainless steel or other corrosion resistant materials are preferred. The vessel 11 may also be insulated to conserve heating requirements and to reduce the heat lost to the surrounding laundry area. Lid 15 is attached to side wall 13 at hinge 16 so that when the lid 15 is open, starch can be added through the open top portion at the open lid 15. The lid 15 can be provided with a handle 17 to aid in opening and closing the lid 15.

A water supply line 18 supplies fluid to inlet jet 19 when control valve 20 is opened. Preferably, water supply line includes a check valve 21 preventing the back flow of water in the line. Heating coil 22 is a steam header (e.g., 3/8" copper conduit) that tracks in a generally circular path approximately adjacent to side wall 13 as shown in FIG. 2. This heating coil 22 receives steam transmitted to vessel 11 via steam inlet line 23. Steam control valve 24 controls the flow of steam through line 23 to heating coil 22. A steam return line 25 is provided for exiting steam from heating coil 22, the return line 25 being provided with steam trap 26.

After a starch solution has been cooked within the interior 12 of vessel 11, that starch solution can be transmitted to a commercial washer (not shown) via flow line 28. Discharge port 27 communicates with discharge flow line 28 so that the starch solution can be drained from the vessel 11 at discharge port 27. The discharge conduit 28 contains a tee fitting 29 for communicating with standpipe 30. The standpipe 30 is used to generate a level indication of the fluid level within interior 12 of vessel 11. Standpipe 30 communicates with level switch 47 via line 46.

Gear pump 31 is disposed in line 28 as shown in FIG. 1. This type of pump 31 is commercially available, such as one manufactured by Dayton and designated as a 1/3 h.p. gear pump. In such a gear pump 31 the meshing geared impellers break up starch lumps when the starch flows through the pump 31 from port 27 into discharge conduit 28 on its way to a commercial laundry washer. A motor drive 32 is provided for driving gear pump 31. In FIG. 1, the pump inlet is designated as 33 and the pump outlet as 34.

A recirculation line 35 is provided for continuously recirculating fluid contained within interior 12 of vessel 11, such as occurs during a heating of the starch solution. This recirculation line 35 includes outlet 36 that communicates with vessel 11 at bottom 14. Gear pump 37 is disposed in recirculation line 35. The gear pump 37 can be the same or similar type of gear pump as the pump 31 used in discharged line 28 (e.g., Dayton 1/3 h.p.). Gear pump 37 is provided with a motor drive 38 for powering the pump 37.

Inlet 39 communicates with vessel 11 at sidewall 13. In this manner, the starch solution can be continuously withdrawn from interior 12 at outlet 36 and pumped through recirculation line 35 to inlet 39. The gear pump 37 is thus in a recirculating position to continuously break up starch lumps that flow from outlet 36 through recirculation line 35 to inlet 39. Preferably, vessel inlet 39 projects the stream of recirculating starch generally tangentially of vessel wall 13 in order to establish a circular or whirlpool type motion to the starch/water mixture. By this whirlpool type motion, a continuous mixing action is imparted to the starch contained in vessel 11 which also contributes to the continuous cleaning of the interior of vessel 11. Such continuing movement also avoids stagnation of the starch in the vicinity of steam header 22 and unwanted heat build-up in the starch in this region. The described circulation also imparts a cleaning action respecting the outlet ports 27 and 36 and tee fitting 29 at standpipe 30 promoting reliable operation of the level control. The combination of continuously pumping the recirculating starch through the gear pump 37 ensures a well mixed, homogenous starch/water solution producing the whirlpool-like stirring and cleaning action which further promotes a homogenous mixture of uniform temperature, all not known in prior mixers.

Thermostat 40 regulates the temperature of starch solution contained within interior 12 of vessel 11 during cooking of the starch solution. Thermostat 40 is controlled by control panel 41 shown in FIGS. 1 and 2. The control panel 41 has a starch switch to begin operation of the device 10 and a stop switch 43 to cease operation. A direct transfer switch 44 is also provided for directly transferring the contents of vessel interior 11 to a laundry washer directly via flow line 28. Light indicator 45 indicates to an operator that the system is in an "on" position.

In a usual cycle for mixing and dispensing a starch/water charge to a washing machine, pressing start button 42 will start the flow of water into vessel 11 via line 18. The volume of water added can be between two and three gallons, selected according to the size of the commercial washing machine. As vessel 11 is filling, and preferably after the whirlpool-like motion of the water in vessel is established, a user adds eight (8) to twelve (12) ounces of uncooked starch. Once water level reaches the point at which it trips the water level switch 47 to turn off water solenoid valve 20, the steam valve 24 starts heating the water/starch mixture by transmitting steam to heating coil 22. At the same time, the circulation pump 37 blends the water/starch mixture.

The steam solenoid 24 will stay energized until the thermostat 40 is satisfied at between about 160 and 190 degrees Fahrenheit (preferably about 190 degrees Fahrenheit). In the illustrated embodiment, a timer will energize and after approximately nine minutes and the green light 45 will illuminate, indicating the starch is ready for injection. The circulation pump 37 will continue running and the temperature will be maintained at between about 180 and 190 degrees until the washing machine signals the starch cooker 10 to activate transfer pump 31. Water/starch mixture will then be transferred to the washing machine and the process is complete.

Cleaning of the vessel after use is similar to the above operation cycle, except that no starch is added. It may be advantageous to heat the water to facilitate cleaning, but such is not usually necessary. The clear (starchless) water is circulated through the machine and then discharged into the washing machine to carry off any residual starch left.

The following table lists the parts numbers and parts descriptions as used herein and in the drawings attached hereto.

PARTS LIST

| Part Number | Description |
| --- | --- |
| 10 | starch cooking apparatus |
| 11 | vessel |
| 12 | interior |
| 13 | side wall |
| 14 | bottom wall |
| 15 | lid |
| 16 | hinge |
| 17 | handle |
| 18 | water supply line |
| 19 | inlet jet |
| 20 | control valve |
| 21 | check valve |
| 22 | heating coil |
| 23 | steam inlet line |
| 24 | steam control valve |
| 25 | steam return line |
| 26 | steam trap |
| 27 | discharge port |
| 28 | discharge conduit |
| 29 | tee fitting |
| 30 | standpipe |
| 31 | transfer gear pump |
| 32 | motor drive |
| 33 | pump inlet |
| 34 | pump outlet |
| 35 | recirculation line |
| 36 | outlet |
| 37 | circulation gear pump |
| 38 | motor drive |
| 39 | inlet |
| 40 | thermostat |
| 41 | control panel |
| 42 | start switch |
| 43 | stop switch |
| 44 | direct transfer switch |
| 45 | light indicator |
| 46 | line |
| 47 | water level switch |
| 48 | timer |

The foregoing embodiments are presented by way of example only; the scope of the present invention is to be limited only by the following claims.

I claim:

1. An apparatus for cooking a starch solution and dispensing the cooked solution to a commercial laundry washer and an access opening for adding dry starch to the interior, comprising:
   a) a vessel with an interior surrounded by a wall for holding a volume of liquid;
   b) a water supply inlet for supplying water to the vessel interior;
   c) a steam supply inlet for adding steam to the vessel interior so that the volume of liquid within the vessel can be heated;
   d) a level controller for controlling the level of fluid within the vessel and in between minimum and maximum fluid levels;
   e) a recirculation flow line that has an inlet and an outlet that each communicate with the vessel interior;
   f) a pump mounted in the recirculation flow line for pumping fluid from the inlet to the outlet for recirculating fluid within the vessel interior, said pump having a geared portion which breaks up starch lumps flowing in said recirculation flow line;
   g) a discharge flow line for transmitting a heated solution of starch and water from the vessel interior to the laundry washer; and
   h) a discharge pump for dispensing the heated solution of starch and water from the discharge flow line to the laundry washer.

2. The starch cooker and dispenser of claim 1 wherein the steam supply inlet includes a header for receiving steam, the header separating the steam from the starch solution.

3. The starch cooker and dispenser of claim 1 further comprising a pump mounted in the discharge flow line for pumping fluid from the vessel to a laundry washer, said pump having a geared impeller that breaks up starch lumps flowing in the discharge flow line.

4. The starch cooker and dispenser of claim 1 further comprising a fluid inlet jet for jetting water into the vessel interior so that a whirlpool-like flow is generated within the vessel to clean the wall of the vessel.

5. The starch cooker and dispenser of claim 1 further comprising a level switch that includes a stand pipe, for activating a fill cycle that adds water to the vessel when a "low level" of fluid is sensed by the level switch within the vessel.

6. The starch cooker and dispenser of claim 1 further comprising a heating coil that extends around the interior of the vessel next to the wall.

7. The starch cooker and dispenser of claim 1 wherein the steam supply inlet communicates with the heating coil.

8. The starch cooker and dispenser of claim 1 wherein the level controller includes means for setting fluid levels within the vessel including a first level for mixing starch and a second level for dispensing cooked starch solution from the vessel to the laundry washer.

9. The starch cooker and dispenser of claim 1 wherein the discharge pump is a gear pump that mechanically breaks up starch lumps that flow through the pump.

10. The starch cooker and dispenser of claim 1 further comprising means for automatically discharging hot starch solution from the vessel when temperature reaches a preselected temperature value.

11. An apparatus for cooking a starch solution and dispensing the cooked solution to a commercial laundry washer, comprising:
   a) a vessel with an interior surrounded by a wall for holding a volume of liquid;
   b) a water supply inlet for supplying water to the vessel interior to make a starch solution that includes the volume of liquid and uncooked starch;
   c) a steam supply inlet for adding steam to the vessel so that the volume of liquid within the vessel can be heated;
   d) a level controller for controlling the level of fluid within the vessel and in between minimum and maximum fluid levels;
   e) a recirculation flow line that has an inlet and an outlet that each communicate with the vessel interior;

f) a pump mounted in the recirculation flow line for pumping fluid from the inlet to the outlet for recirculating fluid within the vessel interior, said pump having a geared portion that breaks up any starch lumps flowing in the recirculation flow line;

g) a commercial washer;

h) a discharge flow line for transmitting a heated starch solution from the vessel interior to a laundry washer; and i) a discharge pump for dispensing the heated starch solution from the discharge flow line to the laundry washer.

12. An apparatus for cooking a starch solution and dispensing the cooked solution to a commercial laundry washer and an access opening for adding dry starch to the interior, comprising:

a) a vessel with an interior surrounded by a wall for holding a volume of liquid;

b) a water supply inlet for supplying water to the vessel interior;

c) a steam supply inlet for adding steam to the vessel interior so that the volume of liquid within the vessel can be heated;

d) a level controller for controlling the level of fluid within the vessel and in between minimum and maximum fluid levels;

e) a recirculation flow line that has an inlet and an outlet that each communicate with the vessel interior;

f) a pump mounted in the recirculation flow line for pumping fluid from the inlet to the outlet and recirculating fluid within the vessel interior so that starch lumps flowing in the recirculation line must flow through the pump enabling the pump to break up the starch lumps;

g) a discharge flow line for transmitting a heated solution of starch and water from the vessel interior to the laundry washer; and h) a discharge pump for dispensing the heated solution of starch and water from the discharge flow line to the laundry washer.

13. The starch cooker and dispenser of claim 12 wherein the steam supply inlet includes a header for receiving steam, the header separating the steam from the starch solution.

14. The starch cooker and dispenser of claim 12 further comprising a pump mounted in the discharge flow line for pumping fluid from the vessel to a laundry washer, said pump having a portion that breaks up any starch lumps flowing in the discharge flow line.

15. The starch cooker and dispenser of claim 12 further comprising a fluid inlet jet for jetting water into the vessel interior so that a whirlpool-like flow is generated within the vessel to clean the wall of the vessel.

16. The starch cooker and dispenser of claim 12 further comprising a heating coil that extends around the interior of the vessel next to the wall.

17. The starch cooker and dispenser of claim 12 wherein the discharge pump is a gear pump that mechanically breaks up starch lumps that flow through the pump.

18. The starch cooker and dispenser of claim 12 further comprising means for automatically discharging cooked starch solution from the vessel when temperature of the cooked starch reaches a preselected temperature value.

19. An apparatus for cooking a starch solution and dispensing the cooked solution to a commercial laundry washer, comprising:

a) a vessel with an interior surrounded by a wall for holding a volume of liquid;

b) a water supply inlet for supplying water to the vessel interior to make a starch solution that includes the volume of liquid and uncooked starch;

c) a heating element disposed within the vessel;

d) a steam supply inlet for adding steam to the heating element so that the volume of liquid within the vessel can be heated;

e) a recirculation flow line that has an inlet and an outlet that each communicate with the vessel interior;

f) a pump mounted in the recirculation flow line for pumping fluid from the inlet to the outlet for recirculating fluid within the vessel interior;

g) a commercial washer;

h) a discharge flow line for transmitting a heated starch solution from the vessel interior to a laundry washer;

i) a discharge pump for dispensing the heated starch solution from the discharge flow line to the laundry washer; and j) at least one of said pumps having a portion that breaks up any starch lumps flowing through the pump.

20. A method for cooking a starch solution and dispensing the cooked solution to a commercial laundry washer comprising the steps of:

a) providing a vessel with an interior for holding a volume of liquid;

b) supplying water and dry uncooked starch to the vessel interior;

c) adding heat to the vessel interior to heat the volume of liquid within the vessel;

d) controlling the level of fluid within the vessel between minimum and maximum fluid levels;

e) recirculating liquid within the vessel during heating of step "c" with a recirculating flow line;

f) transmitting the heated liquid solution of starch and water from the vessel interior to the laundry washer; and g) mechanically breaking up starch that flows in the recirculating flow line in step "f".

21. The method of claim 20 wherein the step "c" includes providing a heating coil that extends around the interior of the vessel adjacent the vessel wall and transmitting heat to the interior of the vessel through said heating coil.

22. The method of claim 21 wherein in step "c" steam is flowed through the heating coil to heat the interior of said vessel.

23. The method of claim 20 further wherein insteps "f" and "g" fluid is pumped from the vessel to a laundry washer with a pump having a geared portion which breaks up starch lumps flowing in the discharge flow line.

24. The method of claim 20 further comprising in step "e" jetting water into the vessel interior so that a whirlpool like flow is generated within the vessel to clean the wall of the vessel.

25. The method of claim 20 further comprising the step of activating a fill cycle that adds water to the vessel when a "low level" of fluid is sensed.

* * * * *